Feb. 24, 1953    J. MIHALYI    2,629,302
TAPE-CONTROLLED CAMERA SHUTTER AND RELEASE
Filed March 10, 1951    4 Sheets-Sheet 1

JOSEPH MIHALYI
Inventor

Daniel J. Mayne
Donald H. Stewart
Attorneys

Feb. 24, 1953 J. MIHALYI 2,629,302
TAPE-CONTROLLED CAMERA SHUTTER AND RELEASE
Filed March 10, 1951 4 Sheets-Sheet 2

JOSEPH MIHALYI
Inventor

By Daniel J. Mayne
Donald H. Stewart
Attorneys

Feb. 24, 1953 — J. MIHALYI — 2,629,302
TAPE-CONTROLLED CAMERA SHUTTER AND RELEASE
Filed March 10, 1951 — 4 Sheets-Sheet 3
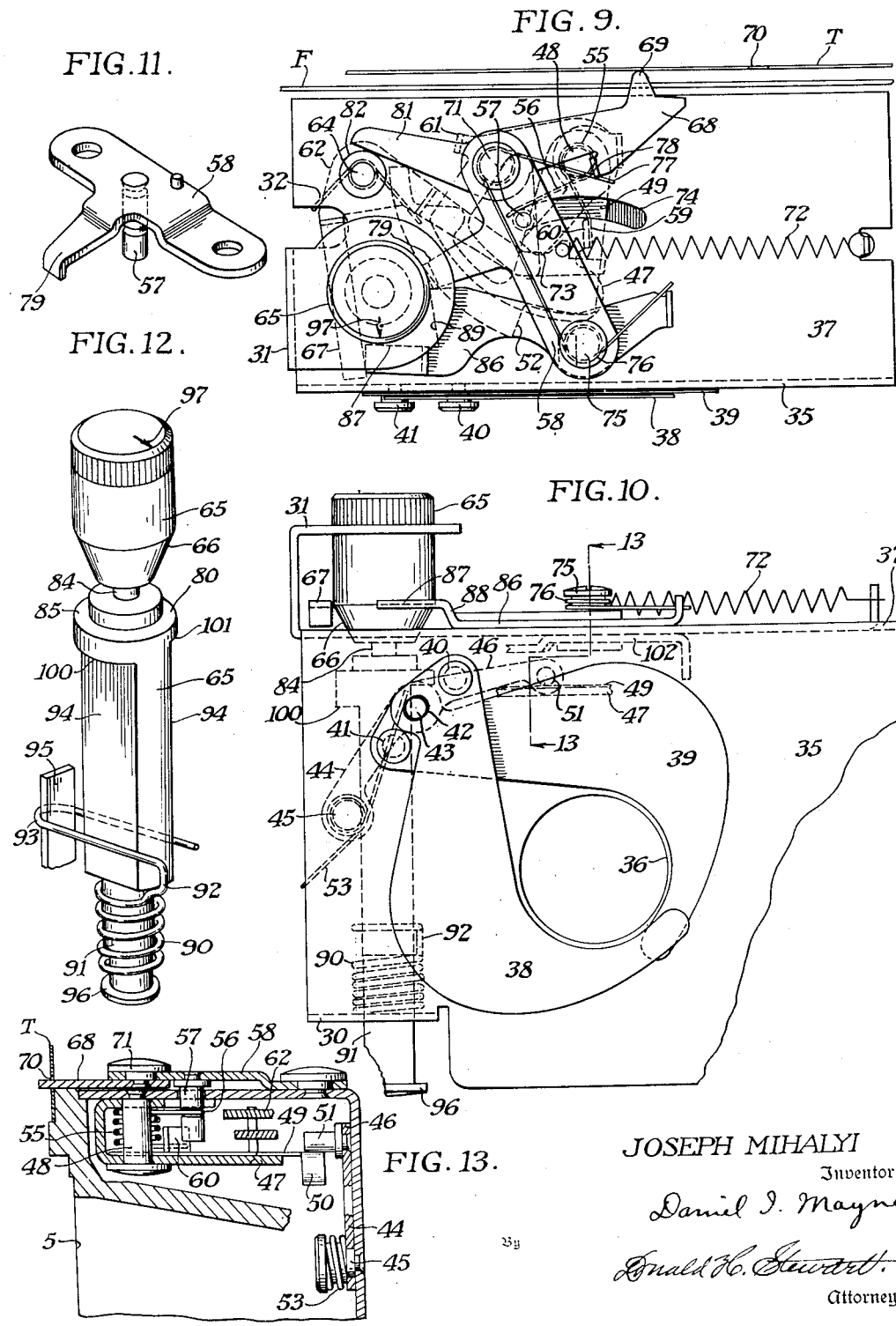
JOSEPH MIHALYI
Inventor
Daniel I. Mayne
Donald H. Stewart
Attorneys Feb. 24, 1953      J. MIHALYI      2,629,302
TAPE-CONTROLLED CAMERA SHUTTER AND RELEASE
Filed March 10, 1951      4 Sheets-Sheet 4
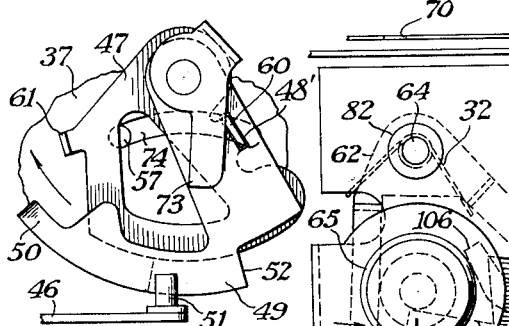
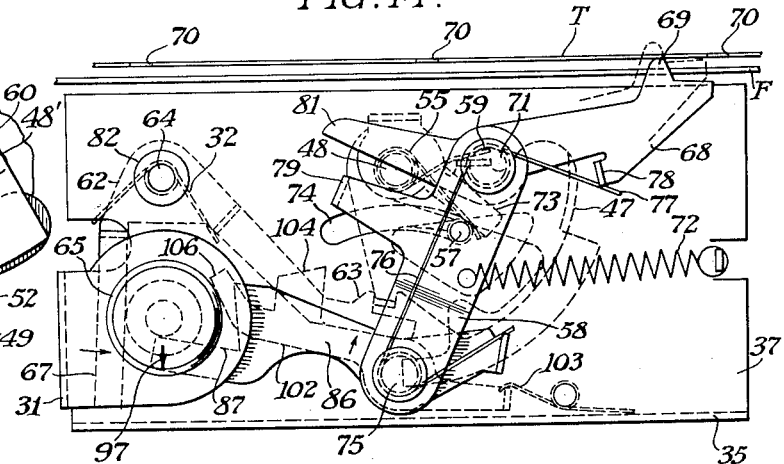
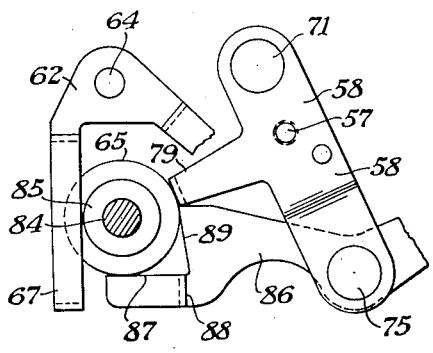
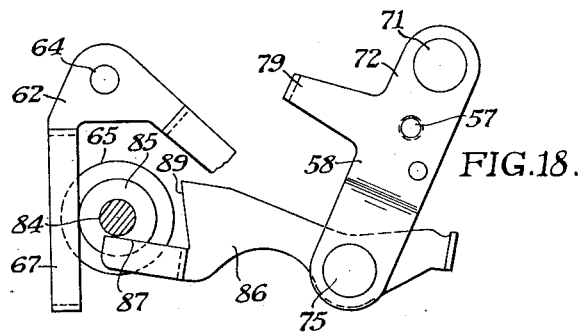
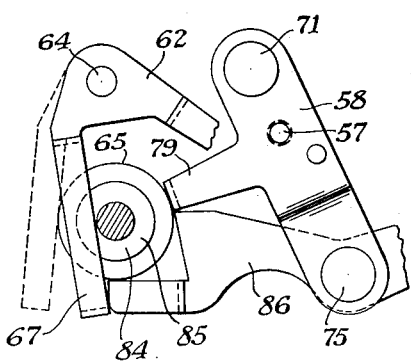
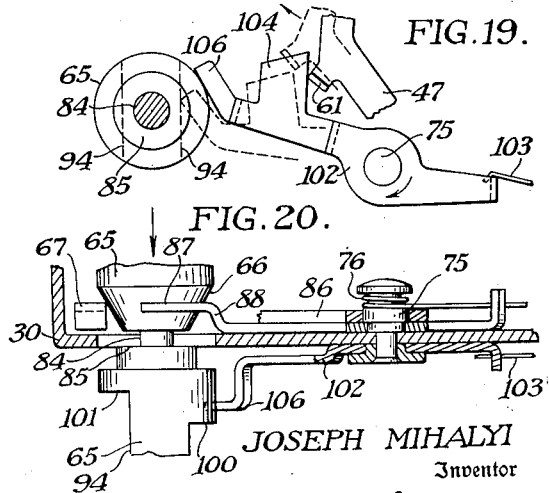
JOSEPH MIHALYI
Inventor
Daniel I. Mayne
Donald H. Stewart
By Attorneys Patented Feb. 24, 1953

2,629,302

UNITED STATES PATENT OFFICE 2,629,302

TAPE-CONTROLLED CAMERA SHUTTER AND RELEASE

Joseph Mihalyi, Rochester, N. Y., assignor to Eastman Kodak Company, Rochester, N. Y., a corporation of New Jersey Application March 10, 1951, Serial No. 214,959

14 Claims. (Cl. 95—31)

This invention relates to photography and more particularly to the control of a camera shutter setting mechanism and a camera shutter releasing mechanism by means of a perforated tape which is moved with the film to control the movement of the film. One object of my invention is to provide a camera shutter mechanism which is so arranged that double exposures cannot be made. Another object of my invention is to provide a mechanism in which a single knob winds the film and tape and conditions the shutter for exposure. Another object of my invention is to provide a mechanism in which releasing the shutter trigger when so conditioned includes means for latching the shutter trigger against movement. Still another object is to provide a foolproof camera with a mechanism which requires only the simple operations of winding film and releasing a shutter. Other objects will appear from the following specification, the novel features being particularly pointed out in the claims at the end thereof.

In the drawings wherein like reference characters denote like parts throughout.

Fig. 9 is a top plan view of the shutter-controlling mechanism with certain parts omitted for the sake of clearness and showing the shutter-timing sector in the position it assumes after an exposure has been made;

Fig. 10 is a front plan view of the mechanism shown in Fig. 9, but with the parts being shown in the position they assume while an exposure is being made and while the shutter blades are fully opened;

Fig. 11 is a perspective view of the shutter-setting lever removed from the controlling mechanism;

Fig. 12 is a perspective view of the shutter trigger showing the means for controlling rotative movement of the trigger as well as the spring tending to hold the trigger in a raised position;

Fig. 13 is a transverse section through the shutter mechanism being taken on line 13—13 of Fig. 10;

Fig. 14 is a top plan view of mechanism before winding the film and setting the shutter;

Fig. 15 is a top plan view of the shutter-timing sector and associated mechanism removed from the remainder of the mechanism and illustrating the position the parts assume while an exposure is being made;

Fig. 16 is a fragmentary top plan view showing levers associated with the trigger in the position they assume before an exposure is made and before the film is wound;

Fig. 17 is a view similar to Fig. 16 but with the parts moved to the trigger-latching position after an exposure is made;

Fig. 18 is a view similar to Figs. 16 and 17 but with the parts in the position they assume after an exposure is made and before film is wound;

Fig. 19 is a fragmentary detail top plan view of the bulb-exposure mechanism removed from the camera, and Fig. 20 is a fragmentary sectional view showing the trigger in elevation and the associated levers in the position they assume as a bulb exposure is being made.

In roll-film cameras, and particularly in roll-film cameras of the so-called extrusion-loading type in which film is unwound from a spool into a loose coil by turning the winding knob in one direction and in which the film is then rewound on the original spool exposing the film as it is rewound, it has been difficult to control a shutter mechanism from the film because such cameras are normally used for relatively narrow width film—such as 16 or 20 mm.—so that any attempt to put perforations in the film utilizes some of the already small film area which might otherwise be used for pictures. The film perforations would have to be very small in such film and consequently would have but little physical strength for operating mechanism. Moreover, it is desirable to use backed film without backing paper and, therefore, a metering mechanism must be employed since numerals directly on film backing are not safe against light which would fog the film. This invention overcomes both of these usual difficulties.

My invention is particularly directed to a mechanism which moves with the film as the film is wound and which is provided with perforations for metering the required amount of film for each exposure, these perforations being also utilized for setting the shutter and controlling the movement of the trigger. In this way, a double-exposure prevention camera is provided without perforating the film itself, and it is possible to place a considerably greater load on a measuring tape than can be applied to more or less brittle film.

My invention consists broadly in providing a perforated metal tape which moves onto a take-up spool as the winding knob is rotated. The connection between the winding tape and the film-winding shaft may be of any preferred type and may be similar to that shown in my copending application Serial No. 210,710, filed February 13, 1951.

Through the connection between the film-winding shaft and the metal tape, the tape may be wound about the take-up shaft while film is being wound onto the film spool carried by the shaft. Thus, the tape and perforations move in timed relation to the film, and my present invention is particularly directed to a mechanism operable through the tape for controlling the movement of the shutter-setting lever and the shutter-tripping lever and thereby to prevent double exposures. In addition, turning a single knob by the operator, conditions the camera for making exposures.

Figure 1:
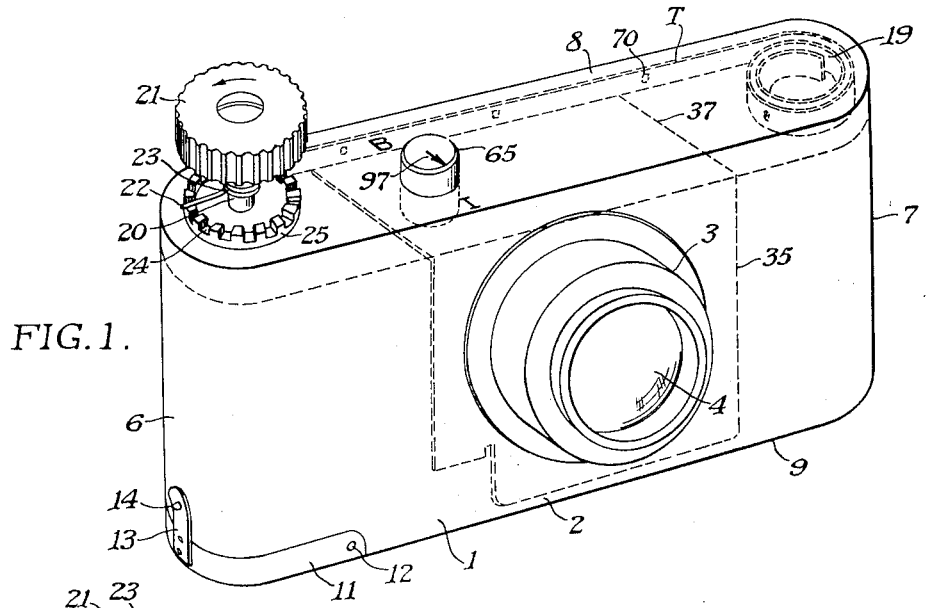
Fig. 1 is a perspective view of a typical camera into which a shutter-controlling mechanism may be incorporated in accordance with my invention.

While my improved apparatus may be utilized with any type of camera, Fig. 1 illustrates a typical camera which may be controlled by my improved mechanism. The camera body 1 includes a front wall 2 which may carry a lens mount 3 having an objective 4 axially arranged with respect to an exposure frame 5. The camera includes end walls 6 and 7, a top wall 8 and a bottom wall 9. The end wall 6 encloses a film chamber 10 which may be considered a film supply chamber into which a spool S may be inserted and removed when a door 11 is swung open about a hinge 12. Film F is schematically shown on spool S. A suitable latch consisting of a spring arm 13 and a protuberance 14 may be used to hold the door closed.

On the opposite end of the camera, the wall 7 forms a portion of a wall of a chamber 15 into which a loose coil 16 of film may be unwound from the spool S. This spool chamber lies below, and substantially coaxial with, a spring chamber 17 which is separated from the spool chamber by a wall 18. A perforated spring or tape T is coiled at 19 about the winding shaft 20 to which a winding knob 21 is attached. The end of the spring tape T is attached to a sheave 19' which may be turned with shaft 20.

Figure 3:
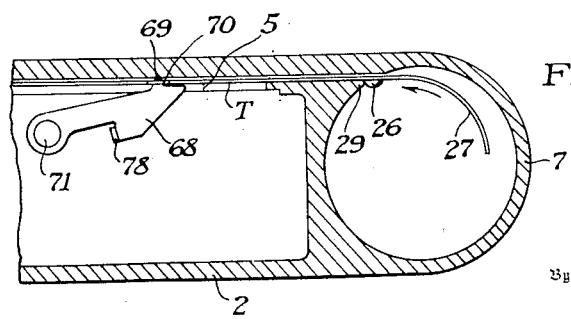
Fig. 3 is a fragmentary detail section taken on line 3—3 of Fig. 2 parts being omitted for clearness.

When the winding knob 21 is drawn out as shown in Fig. 1, the end 22 of a one-way clutch spring 23 is moved away from a slot 24 in the fixed ring 25 so that the film F and tape 18, respectively, may be unwound from the spool S and the shaft 20 into loose coils in the film chamber 15 and tape chamber 17. When the winding knob 21 is pressed downwardly and the spring engages a notch 24, the knob can only be turned in a winding direction, as shown by the arrow in Fig. 1, so that when in this position, film can only be wound onto the spool S. This winding may continue after the film is fully exposed until a pin 26, Fig. 3, on the end 27 of the metal tape may strike a projection 28, thus preventing further winding movement of the spool S after the film is completely wound thereon, and definitely halting movement of the winding handle 21.

Figure 4:
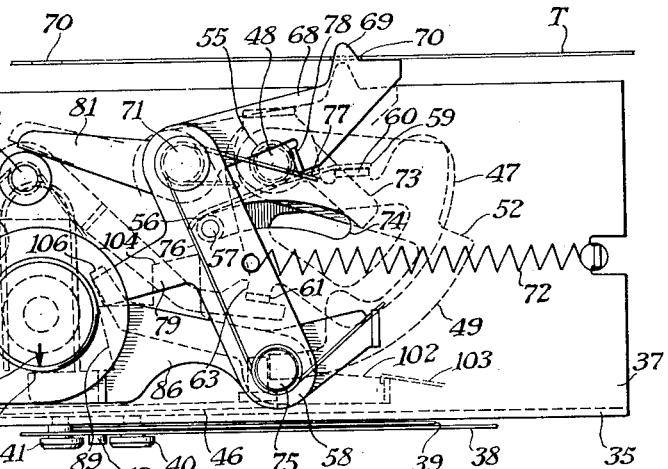
Fig. 4 is a top plan view of a mechanism plate removed from the camera and including shutter-controlling mechanism, the parts being shown set and ready to make an exposure.
Figure 5:
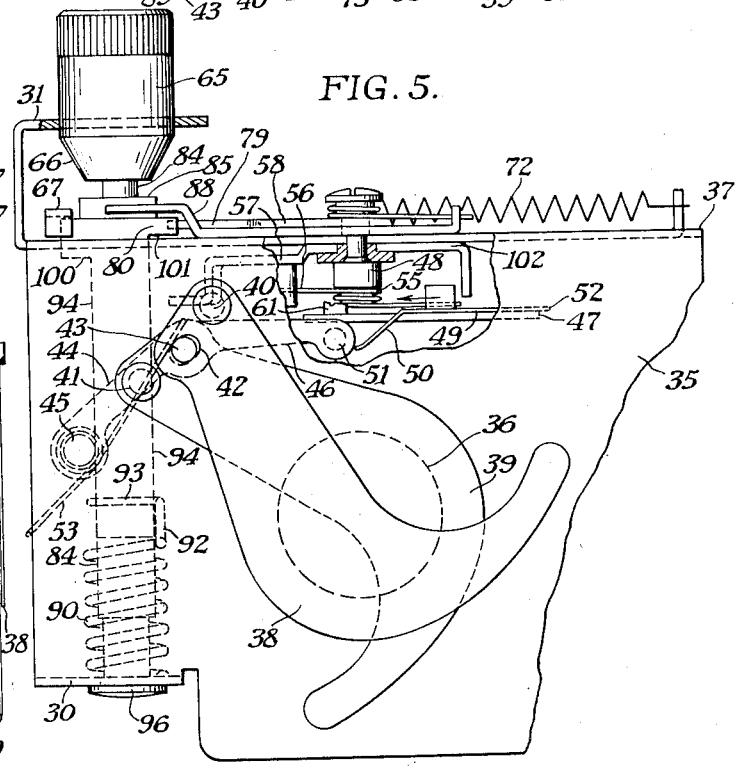
Fig. 5 is a front plan view of the mechanism plate shown in Fig. 4 with portions shown broken away.

The shutter mechanism, Figs. 4 and 5, may include a mechanism plate 35 which has an exposure aperture 36 in the front wall thereof, the mechanism plate also including a top section 37.

A pair of oppositely-moving shutter leaves 38 and 39 are mounted on the front plate 35 on suitable pivots 40 and 41. Each of the leaves has an elongated aperture 42 through which a pin 43 passes, this pin being carried by a lever 44 supported on a pivot 45 carried by the front plate 35. This lever includes an arm 46 which extends into the path of a timing sector 47. The timing sector 47 is mounted to turn on a pivot 48 and includes a spring metal plate 49 having a downwardly-formed end so that when this spring arm moves in the direction shown by the arrow in Fig. 5 a pin 51 on the arm 46 moves up the incline 50 and rides around the upper surface of the plate 49 until it slips off the end 52 of the timing sector 47, thereby permitting a spring 53 pressing on the stud 43 to close the shutter blades 38 and 39 over the exposure aperture 36.

The timing sector 49 also includes a more or less rigid plate 47 turning on the same stud and moving with the spring plate 49 by reason of the lug 60 passing through a slot 48'. The parts may be otherwise fastened together if desired. I prefer two pieces as shown so that ramp 50 and plate 49 may be quite resilient. Spring bronz is suitable material for this purpose.

Figure 8:
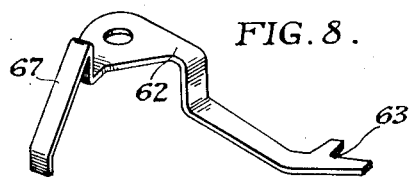
Fig. 8 is a perspective view of a shutter release lever removed from the rest of the controlling mechanism.

A shutter spring 55, Fig. 4, encircles the timing sector supporting pivot 48 as is best shown in Fig. 13. One end 56 of this spring engages a pin 57 extending downwardly from the setting lever 58. The other end 59 of the spring engages an upturned lug 60 on the timing sector plate 47, best shown in Fig. 6. When the spring 55 is tensioned, as indicated in Fig. 4, the shutter is in position for exposure in which it is held by means of a latch lever 62, shown in Figs. 4 and 8, this latching lever including a hook 63 adapted to engage a lug 61 on the timing sector plate as shown in Fig. 4.

The latching lever 62 may be turned around a supporting pivot 64 by the shutter trigger 65 in order to release the shutter since, when properly positioned, the beveled surface 66 of the trigger 65 may engage an arm 67 on the latch lever to release hook 63 from lug 61. When released, the timing sector swings on its pivot 48 so that the ramp 59 on the spring plate 49 will engage the pin 51, opening the blades 38, 39 as the pin rides up the ramp 50 and holding the blades open as the sector swings around clockwise (with respect to Fig. 5) until the pin 51 rides off the end 52 of the plate 49. It will be noticed that in doing this, since the travel of pin 51 up the ramp 50 is short with respect to its total travel to the end 52 of the timing sector, the shutter is actually quite efficient since opening and closing time of the blades is short with respect to the total duration of the exposure.

In order to set the shutter, thereby tensioning the shutter spring 55, mechanism operated by the metal tape T is employed, this mechanism including an indexing lever 68 having a tooth 69 adapted to engage the perforations 70 in the tape T. The indexing lever is pivotally attached at 71 to the shutter-setting lever 58, this latter being shown removed from the mechanism in Fig. 11. This lever 58 carries the downwardly-extending pin 56 previously mentioned, which may ride in a slot 74 in the mechanism plate 37. The lever 58 is pivoted upon a stud 75 and a spring 76 tends to turn lever 58 in a counterclockwise direction with respect to Fig. 4 and, since the end 77 of this spring is anchored on a lug 78 on the lever 68, it also tends to hold this lever against the tape T and to force the finger 69 into a perforation 70 when the tape is moved to bring a perforation to a position to be engaged.

Figure 2:
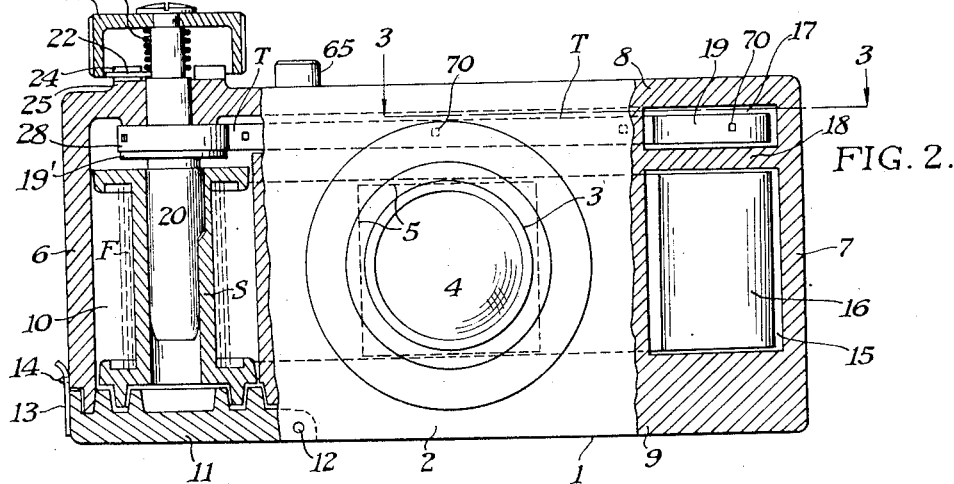
Fig. 2 is a front elevation view of the camera shown in Fig. 1 but with portions of the camera shown in section.

In Fig. 4 the parts are shown with the shutter in position for exposure. To reach this position after an exposure has been made, the winding knob 21 is turned in the direction shown by the arrow in Fig. 1, while the winding clutch 23 is in operative position as shown in Fig. 2 so that the tape 18 and the film F may be wound together. In doing this, the tape moves along until a perforation 70 reaches the finger 69 at which time this finger is moved from approximately the position shown in Fig. 14 to the position shown in Fig. 4. This movement is automatically halted, see Fig. 5, by means of the arm 79 of lever 58 striking a flange 80 on the trigger 65. Thus, the extent of the movement is limited to the amount of movement necessary to wind film the correct distance and, as this film-winding movement occurs, the shutter spring 55 which is unwound in Fig. 14 is wound up in moving toward and reaching the Fig. 4 position. The two ends of the spring are moved relative to each other from the Fig. 14 to the Fig. 4 position. Thus, the shutter spring is automatically tensioned each time the tape is moved to wind film. Also, each time the tape is moved to wind film, the exact amount of film required for an exposure area is brought opposite the exposure frame 5.

Where I refer in the application and claims to an exposure area of film, I mean either an exposure area which exactly fits the exposure frame 5 or an exposure area which is equal to the exposure frame 5 plus a desired margin between exposure frames, the latter being preferable.

The indexing lever 68 is provided with an integral arm 81 which is so positioned that it may strike an abutment 82 as the film and tape are being wound to cam the finger 69 out of the perforation 70. This can only occur at the start of a winding operation because the parts have previously been stopped in their Fig. 4 position through the arm 79 striking the abutment 80 on the trigger. However, when the trigger is depressed to make an exposure, the arm 67 of the latch lever 62 moves into a notch leading to the smallest diameter 84 of the trigger as shown in Fig. 17. This prevents the trigger from moving upwardly and consequently at the start of the winding movement the indexing arm can move slightly further in a clockwise direction with respect to the Fig. 4 position as the arm 79 passes over the shoulder 85 in the trigger and, as soon as the finger 69 is cammed out of the perforation 70, a spring 72 quickly returns the levers 58 and 68 to their Fig. 14 position in which the finger 69 lies against the front surface of the tape T (as shown in full lines) and rides against the tape when the film is later wound so that as soon as a perforation 70 reaches the finger 68 the latter may slip into this perforation (as shown in broken lines) and operate the mechanism through a subsequent cycle.

Figure 6:
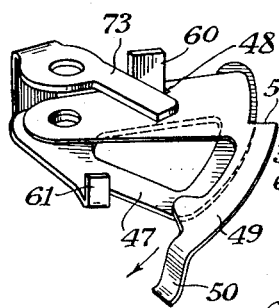
Fig. 6 is a fragmentary perspective detail showing the relation of the shutter-timing sector and ramp, the parts being shown in their set position before an exposure is made. These parts are preferably made in two pieces for convenience but they move together.

During the return movement of levers 58 and 68 when pulled by spring 72, the pin 56, traveling in slot 74, strikes an arm 73, which, as shown in Fig. 6, is part of the timing sector 47. The sector is thus moved counterclockwise about its pivot 48 by the pin 56 and when it reaches the position of Fig. 4 the hook 63 of latch lever 62 blocks its return until the latch lever is again released by trigger 65.

There is a latching lever 86 pivotally mounted on the pivot 75, this lever being normally moved in the direction shown by the arrow in Fig. 14 by a spring 103. The lever 86 is provided with an offset trigger-engaging face 87 which is formed upwardly at 88 as indicated in Fig. 16, and another trigger-engaging face at 89, which lies at substantially right angles to the face 87. Referring to Figs. 16 to 19, inclusive, the function of this lever is to hold the trigger against upward movement while the indexing lever is released from the perforation in the tape at the end of an exposure. Fig. 17 shows the parts in the position they are in before an exposure is made and before the film is wound. In this position it will be noticed that the arm 79 of lever 58 rests against the outside periphery of the trigger 65 and the winding movement has come to rest. The trigger is still held against upward movement by arm 67 of the latching lever 62 so that the hook 63 is still in engagement with the timing sector 61.

The only operation that can now be performed is to wind the film because, if an attempt is made to depress the trigger, it cannot be depressed to release the shutter because of the relationship with arm 67. However, when the winding knob 21 is turned, the indexing mechanism levers 58 and 68 move from their Fig. 4 position, first toward the abutment 82 which quickly cams finger 69 from slot 70, permitting spring 72 to return the parts to their Fig. 4 position. This causes movement of the arm 67 of the latch lever from the Fig. 17 to the Fig. 16 position and the trigger is now held because the parts moved to their Fig. 18 position so that part 87 of lever 86 engages in the notch 84 of the trigger. This leaves the latch lever 62 free to latch the shutter when, after continuing the film-winding movement, the parts are again returned to their Fig. 4 position in which the shutter-driving spring 55 is tensioned. It should be noticed that, in moving the arm 81 into camming engagement with the abutment 82, this slight additional movement causes arm 79 of lever 58 to engage lever 86 and move it from its Fig. 18 position to its Fig. 16 position in which position the trigger is not held downwardly so that it may move upwardly to a position from which it may be actuated as best shown in Figs. 5 and 16.

Figure 7:
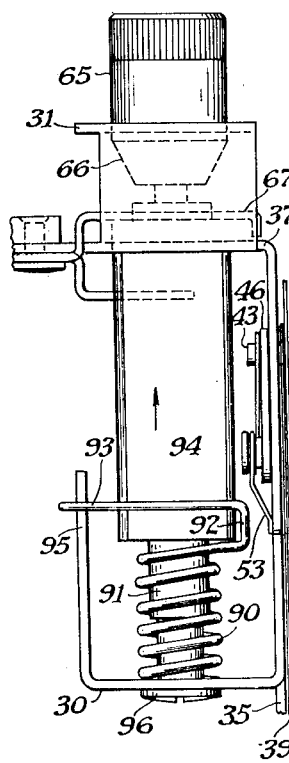
Fig. 7 is an end elevation of a portion of the shutter mechanism plate and trigger showing the bearings and a spring for controlling movement of the trigger, both axially and about its axis.

From Fig. 7 it will be noticed that the trigger 65 is supported by a pair of bearings 30 and 31 which may, if desired, be formed from portions of the front mechanism plate 35 and the top mechanism plate 37 to slidably guide the trigger 65 in vertical axial movement.

There is a spring 90 encircling the lower part 91 of the trigger which is of reduced area, this spring tending to move the trigger upwardly in the direction shown by the arrow in Fig. 7. The spring is also bent upwardly at 92 and into a U-shaped form at 93 to serve two purposes. This construction is best shown in Figs. 7 and 12 where the U-shaped portions 93 of the spring are shown to engage two flat areas 94, one on each side of the trigger 65. This U-shaped portion passes about two sides of a fixed member 95 so that there is no tendency for the trigger to turn and it is, in fact, spring held against turning except when sufficient torque is applied to trigger 97 to operate the spring ends 93.

Spring 90, therefore, holds the trigger in its upper or operative position. Its movement in an upper direction is limited by the cap 96 on the lower end of the reduced area 91 of the trigger so that when the spring 90 is compressed, as shown in Fig. 10, it can only thrust the trigger upwardly into the Fig. 5 position and until stopped by the cap 96 striking the lower bearing 30.

The trigger may be turned by separating the spring ends 93. This permits the trigger to be used as a means for adjusting the camera for prolonged exposures. As indicated in Fig. 1, the trigger 65 is shown as including an indexing arrow 97, which arrow can be moved by turning the trigger so as to lie opposite "I," indicating instantaneous exposures, or "B," indicating bulb exposures. By turning the trigger, one of shoulders 100 or 101, which are different in thickness, may be brought opposite either the "Instantaneous" or the "Bulb" exposure position. A "Bulb" lever 102, best shown in Figs. 19 and 20, is for producing prolonged exposures. Lever 102 is pressed by a spring 103 in the direction shown by the arrow in Fig. 19 in which an offset arm 104 is pressed against the lug 61 on the timing sector and, when in the Fig. 19 position, it may limit the movement of the timing sector 47 to a position in which the shutter blades will remain open. This condition occurs when the shoulder 100, which is the long shoulder in that it extends below shoulder 101, is in the position shown in Fig. 20. Bulb exposures can then be made. However, if the trigger is turned say 180° to the instantaneous exposure position, the short shoulder 101 lies over the inwardly-turned end 106 of the lever 102 and, therefore, the lever can be pressed to the broken line positions in Fig. 19 when moved by the lug 61 of the timing sector and, accordingly, the timing sector may rock further to the left with respect to Fig. 19 and, consequently, a complete instantaneous exposure can be made.

From the above description, it will be seen that the present embodiment of my invention is one which carries out the various objects of my invention and one which may furnish a mechanism which is extremely simple to operate from the user's standpoint. Assuming there is no film in the camera, the operation of loading, exposing and unloading is extremely simple and as follows:

The door 11 in the end of spool chamber 10 is opened, releasing the latch 13, 14 and swinging the door about its hinge 12. A film spool S, carrying film F, may then be slid on the winding key-shaft 20 with a configuration in the spool engaging a configuration on the winding shaft in a known manner. The door may then be closed and latched and the winding key 21 drawn outwardly into the Fig. 1 position. When in this position it can be turned in a direction opposite to the winding key arrow of Fig. 1 and the film F is extruded by being pushed from the spool S to a guideway and into the film chamber 15 in a known manner. As this occurs the spring metal tape T having perforations therein is moved into a chamber 17 and the unwinding movement occurs until the winding key can no longer be turned. This particular feature—the winding key-shaft and its specific form of driving connection with the spring metal tape T—forms no part of the present invention, but is described in my copending application Serial No. 210,710 above referred to. When the winding key can no longer be turned, the film has all been extruded into chamber 15 and the winding key is pushed downwardly, connecting the clutch spring arm 22 with a notch 24 and preventing further movement because of the clutch in an unwinding direction.

The winding knob is now turned in the direction shown by the arrow, (Fig. 1), until the mechanism comes to a stop. This causes the film-indexing mechanism comprising the generally toggle-shaped links 68 and 58 to move, setting the shutter spring 55 and positioning the parts in the Fig. 4 position in which the mechanism is ready for an exposure. By depressing the trigger 65, the arm 67 of the latch lever releases the latch elements 61, 63 so that the timing sector 47 may now swing and the pin 51 of the shutter lever will be driven up the ramp 50 and across the plate 49 until it drops off the end 52 of this plate completing an exposure and permitting the spring 53 to close the shutter blades. If now the operator attempts to depress the trigger 65, this cannot be accomplished because it is held against material upward movement by the latching lever 67 so that the operator immediately knows that he must now wind film. Turning the knob 21 in the only direction possible at the time, the arm 81 moves from its full to its broken-line position in Fig. 4 releasing the finger 69 from an aperture 70 and permitting the finger to ride on the tape T and move to its Fig. 14 position from which position continued turning of the winding key will cause the tape to move the finger 69 to the Fig. 4 position, again positioning the mechanism for a second instantaneous exposure and, at the same time, removing the restrictions against return movement of the trigger from its path permitting the trigger to move to its Fig. 5 position while retaining the tape against movement because of the continued engagement of the finger 69 and the aperture 70.

If the operator should desire to make a prolonged exposure, it is only necessary to turn the shutter trigger from its Fig. 1 position to the position in which the indexing arrow 90 will point to B. By doing this, the long shoulder 100 of the trigger 65 is positioned opposite the bulb lever 102 so that, since the end 106 can swing a sufficient distance to permit the timing member 47 to complete its movement, this member will be stopped while the pin 51 still lies on the top of the plate 49 and, consequently, the blades are held open for a bulb exposure.

It should be noticed that the ramp 50 is formed of spring metal such as spring bronz or the like so that, on the return movement of the timing sector, the spring arm 50 may swing over the top of the pin 51 and the blades will remain in their closed position.

While it is obvious that various modifications may be suggested by the preferred form of my invention described above, any such embodiments as may come within the terms of the appended claims are considered as within the scope of my invention.

Having thus described my invention, what I claim is new and desire to secure by Letters Patent of the United States is:

1. In a roll-holding camera, the combination with a camera body including film chambers, an exposure frame, a winding key extending into one spool chamber to support a film spool therein, of a perforated spring metal tape operably connected to the winding key and adapted to move into a coil, the perforations being spaced a distance to define a picture area, said tape being moveable with the winding key-post to control movement thereof, a shutter mechanism including a spring and shutter blades movable thereby, a shutter-setting lever for tensioning the spring, an indexing lever pivoted thereto, an aperture-engaging finger on the indexing lever normally contacting with the perforated tape, a movable shutter trigger, and means on the trigger lying in the path of movement of the shutter-setting lever for limiting movement of the shutter setting and indexing levers to determine the winding necessary to present a fresh area of film into position for exposure while a tape aperture moves the indexing lever through engagement with the aperture-engaging finger, whereby said finger engaging a tape perforation may stop movement of the tape and film.

2. In a roll-holding camera, the combination with a camera body including film chambers, an exposure frame, a winding key extending into one spool chamber to support a film spool therein, of a perforated spring metal tape adapted to move into a coil, the perforations being spaced a distance to define a picture area, operable connections between the tape and winding key whereby said tape is moveable with the winding key-post to control movement thereof, a shutter mechanism including a spring and shutter blades movable thereby, a pivotally mounted shutter-setting lever, an indexing lever pivoted thereto, an aperture-engaging finger on the indexing lever normally spring-pressed into engagement with the perforated tape, a shutter trigger, and means on the trigger and lying in the path of movement of the shutter-setting lever for limiting movement of the shutter setting and indexing levers to determine the winding necessary to present a fresh area of film into position for exposure, said means on the trigger being moveable when the trigger is depressed to make an exposure to a position in which the shutter-setting lever may move further in the same direction, and an abutment lying in the path of the indexing lever to cam the finger from a tape aperture when said setting lever is moved further in the same direction.

3. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching an end of the tape to the winding key-post said tape being movable with the winding key-post to control movement thereof, a shutter mechanism including a spring, a shutter-setting lever to tension the spring, and indexing lever pivoted to the setting lever, an aperture-engaging finger on the indexing lever normally spring-pressed against the perforated tape, a shutter trigger, and means on the trigger lying in the path of movement of the shutter-setting lever for limiting movement of the shutter setting and indexing levers to determine the winding necessary to present a fresh area of film into position for exposure, said means on the trigger being movable when the trigger is depressed to make an exposure to a position in which the shutter-setting lever may move further in the same direction, an abutment lying in the path of the indexing lever to cam the finger from a tape aperture when said setting lever is moved further in the same direction, and a spring for moving the indexing and shutter-setting levers in a reverse direction whereby said finger may lie against the perforated tape.

4. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the tape to the winding key-post, said tape being movable with the winding key-post to control movement thereof, a shutter mechanism including a spring, a shutter-setting lever for tensioning the spring, an indexing lever pivoted to the shutter-setting lever, an aperture-engaging finger on the indexing lever normally lying against the perforated tape, a movable shutter trigger, and means on the trigger lying in the path of movement of the setting lever for limiting movement of the shutter setting and indexing levers to determine the winding necessary to present a fresh area of film into position for exposure, said means on the trigger being movable when the trigger is depressed to make an exposure out of the path of the shutter-setting lever and to a position in which the shutter-setting lever may move further in the same direction, an abutment lying in the path of the indexing lever to cam the finger from a tape aperture when said setting lever is moved further in the same direction, a spring for moving the indexing and shutter-setting levers in a reverse direction whereby said finger may lie against the perforated tape, in position to enter a tape aperture when the tape and film are again wound, said finger releasing the winding key for movement when cammed from a tape aperture, and a one-way clutch preventing movement of the winding key in an unwinding direction.

5. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the tape to the winding key-post said tape being movable with the winding key-post to control movement thereof, a shutter mechanism including a spring, a shutter-setting lever for tensioning the spring, and indexing lever pivoted to the shutter-setting lever, an aperture-engaging finger on the indexing lever normally lying against the perforated tape, a movable shutter trigger, and means on the trigger for limiting movement of the shutter setting and indexing levers to determine the winding necessary to present a fresh area of film into position for exposure, shutter leaves, the mechanism for operating the shutter leaves including the spring, the shutter-setting lever directly engaging one end of the spring to wind up the spring as the shutter-setting lever is moved from its rest position in which the indexing lever lies with the finger positioned for engagement with a tape aperture to the stop position in which the shutter-setting lever rests against the trigger.

6. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the spring to the winding key-post, said tape being movable with the winding key-post to control movement thereof, a shutter mechanism including a spring, a shutter-setting lever for tensioning the spring, and indexing lever pivoted to the shutter-setting lever, an aperture-engaging finger on the indexing lever, a movable shutter trigger, and means on the trigger for limiting movement of the shutter setting and indexing levers to determine the winding necessary to present a fresh area of film into position for exposure, shutter leaves, said shutter mechanism operating the shutter leaves including the spring, the shutter-setting lever directly engaging one end of the spring in tensioning the spring, a timing sector included in the shutter, the other end of the spring engaging the timing sector, the shutter-setting lever winding up the spring when moved towards its stop position against the trigger, and a timing sector latch included in the shutter, for holding the timing sector against movement during the setting movement of the setting lever.

7. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the spring to the winding key-post, said tape being movable with the winding key-post to control movement thereof, a shutter mechanism including a spring, a shutter-setting lever for tensioning the spring, and indexing lever pivoted to the shutter-setting lever, an aperture-engaging finger on the indexing lever having a normal position in contact with the perforated tape, a movable shutter trigger, and means on the trigger and lying in the path of the shutter-setting lever for limiting movement of the shutter setting and indexing levers to determine the winding necessary to present a fresh area of film into position for exposure, shutter leaves pivotally mounted in the shutter, said mechanism operating the shutter leaves including the spring, the shutter-setting lever directly engaging one end of the spring, a timing sector included in the shutter, the other end of the spring engaging the timing sector, the shutter-setting lever winding up the spring when moved towards its stop position against the trigger, and a timing sector latch included in the shutter, for holding the timing sector against movement during the setting movement of the setting lever, the shutter trigger including a beveled surface for engaging and moving the latch lever to release the timing sector.

8. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the perforated tape to the key-post, said tape being movable with the winding key-post to control movement thereof, a shutter mechanism including a spring, a movably mounted shutter-setting lever for tensioning the spring, an indexing lever pivoted thereto, an aperture-engaging finger on the indexing lever having a normal position resting against the perforated tape, a shutter trigger, and means on the trigger for limiting movement of the shutter setting and indexing levers to determine the winding necessary to present a fresh area of film into position for exposure, shutter leaves pivotally mounted in the shutter, said mechanism operating the shutter leaves including the spring, the shutter-setting lever directly engaging one end of the spring, a timing sector included in the shutter, the other end of the spring engaging the timing sector, and a timing sector latch included in the shutter, for holding the timing sector against movement during the setting movement of the setting lever, the shutter trigger including a beveled surface for engaging and moving the latch lever to release the timing sector, and coacting surfaces on the trigger and the latch lever for holding the trigger against movement after said trigger is depressed to make an exposure.

9. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the perforated tape to the key-post, said tape being movable with the winding key-post to control movement thereof, a shutter mechanism including a spring, a shutter-setting lever, and indexing lever pivoted thereto, a finger for engaging a perforation in the spring metal tape on the indexing lever, a movably mounted shutter trigger, and means on the trigger for limiting movement of the shutter setting and indexing levers to determine the winding necessary to present a fresh area of film into position for exposure, shutter leaves pivotally mounted in the shutter mechanism, mechanism for operating the shutter leaves including the shutter spring, the shutter-setting lever directly engaging one end of the spring, a timing sector included in the shutter, the other end of the spring engaging the timing sector, the shutter-setting lever winding up the spring when moved towards its stop position against the trigger, and a timing sector latch lever for engaging the timing sector included in the shutter, for holding the timing sector against movement during the setting movement of the setting lever, the shutter trigger including a beveled surface for engaging and moving the latch lever to release the timing sector, and coacting surfaces on the trigger and the latch lever for holding the trigger against movement after said trigger is depressed to make an exposure, and a spring tending to turn the latch lever into engagement with the trigger and into engagement with the timing sector to be moved thereby as the timing sector is moved to a set position.

10. In a roll-holding camera, the combination with a camera body including two film chambers spaced by an exposure frame, a winding key and shaft, the shaft extending into a film chamber for drivingly engaging a film spool, of a perforated tape of a type tending to move into a coil and having one end attached to and operable with the winding key and shaft, the perforations being spaced for measuring exposure areas of film, a shutter of the setting type and including a setting lever and a trigger, mechanism operable by a perforation in the tape for setting the shutter-setting lever and including an indexing lever, the trigger lying in the path of and stopping movement of the setting lever, the trigger including an undercut portion brought into the path of the setting lever when the shutter trigger is depressed whereby said setting lever may move further in the same direction for setting the shutter when the winding key is turned, an abutment lying in the path of the indexing lever, a perforation-engaging finger on the indexing lever normally engaging the perforated tape, the abutment engaging the indexing lever to remove the finger thereof from a perforation in the tape, and a spring for moving the setting lever and indexing lever to a rest position wherein the finger may again rest on the tape, a supplementary latch lever normally spring-pressed toward the trigger having an arm positioned to engage the trigger and the undercut portion thereof to restrain movement of the trigger to a rest or an exposure-making position, the supplementary latch lever lying in the path of and being movable by the shutter-setting lever as the latter moves to a stop position resting against the trigger whereby the trigger may be released from the supplementary latch, and a spring for moving the trigger to a shutter-releasing position when so released.

11. In a roll-holding camera, the combination with a camera body including two film chambers spaced by an exposure frame, a winding key and shaft, the shaft extending into a film chamber for drivingly engaging a film spool, of a perforated tape of a type tending to move into a coil and operable with the winding key and shaft, the perforations being spaced for measuring exposure areas of film, means for attaching one end of the perforated tape to the shaft, a shutter of the setting type and including a setting lever and a trigger, mechanism operable by a perforation in the tape for setting the shutter-setting lever and including an indexing lever, the trigger lying in the path of and stopping movement of the setting lever, the trigger including an undercut portion brought into the path of the setting lever when the shutter trigger is depressed, whereby said setting lever may move further in the same direction for setting the shutter when the winding key is turned, an abutment lying in the path of the indexing lever, a finger for engaging a perforation in the perforated tape on the indexing lever, the abutment engaging the indexing lever to remove the finger thereof from a perforation in the perforated tape, and a spring for moving the setting lever and indexing lever to a rest position wherein the finger may rest on the tape, flat surfaces carried by the trigger adjacent shoulders spaced axially of the trigger, a spring means tending to hold the trigger in a raised position of rest, spring means also engaging the flat surfaces tending to restrain the trigger against turning but permitting turning against spring pressure, and a bulb lever spring-pressed from the trigger, the shutter including a timing sector pivotally mounted on the camera, means on the timing sector for moving the bulb lever into contact with the trigger when the trigger is in one position and into contact with the trigger beneath a shoulder when the trigger is in another position to determine the type of exposure.

12. The roll-holding camera structure defined in claim 11 characterized in that the spring means acting on the trigger is a single spring with coils on one end adapted to move the trigger to a position of rest and a U-shape on the other end to engage a fixed support and the flat surfaces of the trigger to impede rotational movement of the trigger.

13. In a roll-holding camera, the combination with a camera body including film chambers, an exposure frame, and a winding key-post extending into one spool chamber to support a film spool therein, of a perforated spring metal tape adapted to move into a coil, the perforations being spaced a distance to define a picture area, means for attaching one end of the perforated tape to the key-post, said tape being movable with the winding key-post to control movement thereof, a shutter including a spring, and a shutter-setting lever, an indexing lever pivoted thereto, an aperture-engaging finger on the indexing lever having a normal position of rest on the perforated tape, a movable shutter trigger, and means on the trigger for limiting movement of the shutter setting and indexing levers to determine the winding necessary to present a fresh area of film into position for exposure, a release lever included in the shutter and having an arm engageable with the trigger, a supplementary latch lever pivotally mounted and having an arm engageable with the trigger, the trigger including a shoulder adapted to be engaged by the release lever and by the supplementary latch, and shutter mechanism coacting with the release lever and supplementary levers for moving the latter against the trigger shoulder before the release lever disengages the trigger.

14. In a roll-holding camera, the combination with a camera body including film chambers, an exposure frame, a winding key-post extending into one spool chamber to support a film spool therein, of a perforated spring metal tape adapted to move into a coil, the perforations being spaced a distance to define a picture area, means for attaching one end of the perforated spring metal tape to the key-post, said tape being movable with the winding key-post to control movement thereof, a shutter including mechanism driven by a spring, a shutter-setting lever to tension the spring, and indexing lever pivoted to the shutter-setting lever, an aperture-engaging finger on the indexing lever and normally lying against the perforated spring metal tape, a shutter trigger, and means on the trigger for limiting movement of the shutter setting and indexing levers to determine the winding necessary to present a fresh area of film into position for exposure, a release lever included in the shutter and having an arm engageable with the trigger, a supplementary latch lever pivotally mounted and having an arm engageable with the trigger, the trigger including a shoulder adapted to be engaged by the release lever and by the supplementary latch, said shutter mechanism coacting with the release lever and supplementary levers for moving the latter against the trigger shoulder before the release lever disengages the trigger, and means on the shutter-setting lever for moving the supplementary latch from a latching position only when the shutter is set.

JOSEPH MIHALYI.

No references cited.